United States Patent
Michel et al.

(10) Patent No.: US 8,613,998 B2
(45) Date of Patent: Dec. 24, 2013

(54) FILM ARRANGEMENT

(75) Inventors: Uwe Michel, Berlin (DE); Bernhard Müssig, Seevetal (DE)

(73) Assignee: tesa SE, Hamburg (DE)

( * ) Notice: Subject to any disclaimer, the term of this patent is extended or adjusted under 35 U.S.C. 154(b) by 738 days.

(21) Appl. No.: 12/363,136

(22) Filed: Jan. 30, 2009

(65) Prior Publication Data

US 2009/0233070 A1 Sep. 17, 2009

(30) Foreign Application Priority Data

Mar. 11, 2008 (DE) .......................... 10 2008 013 689

(51) Int. Cl.
*B32B 27/32* (2006.01)
*B32B 7/02* (2006.01)
*B32B 5/18* (2006.01)

(52) U.S. Cl.
USPC ........... 428/213; 428/212; 428/215; 428/216; 428/220; 428/515

(58) Field of Classification Search
USPC .............. 428/212–220, 411.1, 500, 515–523, 428/480, 483, 474.4–476.9, 34.1, 34.6–34.7, 428/35.7–36.91, 340–355 N; 264/173.11–173.16, 209.1–209.5, 210.1–210.7, 264/288.4, 291, 900–904, 909
See application file for complete search history.

(56) References Cited

U.S. PATENT DOCUMENTS

| | | | |
|---|---|---|---|
| 4,167,234 A | | 9/1979 | Gordon et al. |
| 5,028,480 A | * | 7/1991 | Dean ........................... 428/314.4 |
| 5,376,430 A | * | 12/1994 | Swenson et al. .............. 428/152 |
| 5,468,428 A | * | 11/1995 | Hanschen et al. ............. 264/483 |
| 5,472,775 A | * | 12/1995 | Obijeski et al. ............... 428/220 |
| 6,410,129 B2 | * | 6/2002 | Zhang et al. ................ 428/318.6 |
| 6,803,101 B1 | | 10/2004 | Böhm et al. |
| 2003/0040582 A1 | | 2/2003 | Braga et al. |
| 2006/0286386 A1 | | 12/2006 | Sabbagh et al. |
| 2007/0092704 A1 | * | 4/2007 | Patel et al. .................... 428/212 |

FOREIGN PATENT DOCUMENTS

| | | |
|---|---|---|
| DE | 29 26 110 A1 | 2/1980 |
| DE | 199 23 780 A1 | 11/2000 |

OTHER PUBLICATIONS

"Polypropylene Homopolymer". Plastics International; Retreived Nov. 2, 2011.*
"Dow HDPE 12450N High Density Polyethylene". MatWeb; Retrieved Nov. 2, 2011.*

* cited by examiner

*Primary Examiner* — Prashant J Khatri
(74) *Attorney, Agent, or Firm* — Norris McLaughlin & Marcus PA

(57) ABSTRACT

The present invention relates to a film arrangement featuring a layer A and a layer B, layer A and layer B being of polymer-based formation, and layers A and B being unstretched. It is proposed that layer A and layer B have different tension sets from one another, that layer A has a tension set of at least 60% and that layer B has a tension set of not more than 50%.

10 Claims, 1 Drawing Sheet a) b)

c)

FILM ARRANGEMENT

BACKGROUND OF THE INVENTION

In the prior art a very wide variety of kinds and compositions of multi-layer film arrangements are known to be used. Such film arrangements are employed typically for any of a very wide variety of purposes, including, for example, as carriers for an adhesive article. A feature common to these conventional film arrangements is that they are to be highly uniform and planar in formation, in order, for example, to avoid fluctuations in optical properties (transparency), in surface roughness, etc.

Known film arrangements may comprise, for example, unoriented films made from thermoplastics. These films can be extended by tensile stress. The product is a film having a greater length, a lower thickness, and, in general, a lower width. The film remains substantially flat. Where the film is composed of a partially crystalline thermoplastic, such as a polyolefin, the reduction in width and thickness is not uniform; instead, locally, there is formation of a constriction (neck-in) of high crystallinity, which increases further as extension continues. Following relaxation, the film continues to be flat (substantially two-dimensional), and has a lower width and thickness and a greater length than before the tensile test.

SUMMARY OF THE INVENTION

The problem addressed by the present invention is that of specifying a film arrangement that opens up further possibilities for use.

The present invention is based on the finding that a film arrangement must not in every case be of planar formation and must not in every case remain planar on stretching. Instead it may also be desirable to create a film arrangement which, after extension and subsequent relaxation, does not remain planar but instead has a three-dimensional structure. A film arrangement of this kind is suitable, for example, for preventing re-use of the film arrangement, for providing a visual indication that extension has taken place or for supporting the detachment of the film arrangement from a substrate.

The film arrangement of the invention features at least one layer A comprising a polymer having a tension set of more than 60%, and a layer B comprising a polymer having a tension set of less than 50%. This film arrangement is initially of unstretched formation, i.e. no tensile deformation has taken place prior to the use of the film. After extension (stretching) by at least 100%, preferably by at least 500%, and subsequent relaxation, the film of the invention forms a structured surface and/or, preferably, a three-dimensionally shaped body. Since this deformation is irreversible, the film can be used as an indicator of a tensile load and its extent and/or the deformation resulting therefrom.

The tension set is defined as the deformation which remains in a specimen in the relaxed state after the latter has been exposed to a constant extension for a defined time (in the present case, 1 minute) (DIN ISO 2285:2003-07). The tension set is expressed as a percentage of the extension.

DETAILED DESCRIPTION

Besides layers A and B, the film arrangement may also feature further layers which support the three-dimensional deformation on extension or else which provide completely different functions. In particular, for example, there may be one or more adhesive layers provided in order to form the film arrangement as an adhesive article, more particularly as an adhesive tape or label. In each case, however, even in the case of a multi-layer film arrangement, it is preferred for the layers A and B to be disposed directly above one another. This arrangement permits the optimum harmonization of the two layers to one another for the purpose of obtaining the desired deformation.

Layer A of the film arrangement preferably has a tension set of at least 70%, more preferably of at least 90%. Layer B, for its part, preferably has a tension set of not more than 40%. In particular the difference in tension set between the two layers A and B ought to be as large as possible, since a corresponding design allows particularly strong deformation to be ensured. At the same time, strong deformation also ensures the irreversibility even under additional extension influences, such as high temperature, for example.

In a further-preferred embodiment, the two layers A and B are based on polymers of the same kind, and thus differ only in their overall composition, but not in their main constituent. A design of this kind is particularly advantageous from a production standpoint, since the two layers can be processed, for example, in similar temperature ranges. Furthermore, a similar formation of the two layers A and B in terms of their constituents also makes it easier to modify the arrangement to the requirements that must be met in terms of environmental influences (temperature stability, aging resistance, etc.).

Polyolefins have been found to be particularly suitable as a polymeric basis for layer A and/or layer B, although other polymers can likewise be used as a basis for the layers.

On extension beyond the yield point (at about 10% extension), layer B undergoes largely elastic deformation, but layer A undergoes predominantly plastic deformation. If the film arrangement is relaxed, it undergoes three-dimensional deformation: the assembly becomes longer, thicker and narrower than prior to the extension loading. For this effect to be significantly pronounced, layer B ought to be significantly thicker than layer A. In particular, the thickness of layer B ought to be at least three times, preferably five times, the thickness of layer A.

In a further-preferred embodiment, at least one layer, especially layer B, of the film construction is foamed. Foaming allows the layer to be relatively thick without the need for additional material. Since, however, only the thickness is relevant for the setting of the specific flexural modulus of a layer, it is possible by foaming to achieve an increase in the specific flexural modulus in an inexpensive way.

In one preferred embodiment the film arrangement after stretching features one or two hollow cylinders slit in the longitudinal direction. In other words, the differences in design between the two layers A and B cause the film arrangement to roll up about its longitudinal axis during extension and subsequent relaxation.

Since layer B, on account of its high elasticity, may be self-adhering, and since this quality may lead to the blocking of the roll of film, it is advisable to apply a layer C which has no propensity towards blocking. Blocking in this context means an inability or difficulty in peeling the wound film arrangement, or possibly only regions thereof. An additional layer C, which in particular is not of self-adhering formation, hence improves the processing properties of the film arrangement in the production operation. Like layers A and B, layer C is preferably also of polymer-based formation. Furthermore, layer C need not be directly connected to layer B; it is also possible to provide further layers between layer B and layer C. For a highly compact construction of the film arrangement, however, it is preferred to have a direct arrangement of layer C on layer B, thus producing a layer sequence A, B, C.

An additional layer C is particularly advantageous, moreover, if it is disposed on the side of layer B that is opposite layer A. Layer B is therefore encapsulated from either side, and protected from damage and contamination. The third layer also makes it easier to achieve precise setting of the desired deformation of the film construction.

Where layers A and C are composed of identical or similar material, in other words are based on polymers of the same kind, and where, furthermore, they have the same thickness, the product is not the preferred, three-dimensionally shaped body: instead, a flat film is formed, with a rough surface similar to that of finely creped paper. Accordingly, layers A and C ought to have different compositions or, if they have the same composition, ought at any rate to have different thicknesses.

If a layer C is present, the thickness of layer A ought to be at least 1.5 times, preferably at least 2.0 times, the thickness of layer C. In this way, where the layers A and C are composed of different materials, a three-dimensionally shaped body can be formed when layers A and C have the same thickness. This, however, is dependent on the specific flexural modulus $E_S$ of the respective layers. The specific flexural modulus is defined by the flexural modulus of the material $E_B$ of the layer in question, multiplied by the thickness of the respective layer. The ratio of the specific flexural modulus $E_S$ of layer A to the specific flexural modulus $E_S$ of layer B ought to be greater than 20, preferably greater than 30. Furthermore, layer C ought likewise to have a relatively high tension set, more particularly a tension set of at least 60%, preferably of at least 70%, very preferably of at least 90%, in order to intensify the plastic deformation of the film arrangement.

In a preferred embodiment the tension set of layer A and/or of layer C may be tailored and also improved through the addition of hydrocarbon resins, of the kind used, for example, for what are called twist packaging films (sweet wrappers).

Examples of preferred raw materials for layers A and C are thermoplastic polyolefins, polyamides, polystyrenes and polyesters. Further-preferred raw materials are polyolefins such as ethylene-vinyl acetate (EVA), ethylene-acrylate (EA), ethylene-methacrylate (EMA), low-density polyethylene (PE-LD), linear low-density polyethylene (PE-LLD), very low-density linear polyethylene (PE-VLD), polypropylene homopolymer (PP-H), polypropylene copolymer (PP-C) (impact, i.e. copolymerized with ethylene-propylene rubber, or random, i.e. with comonomers distributed randomly in the chain). Polymers of layers A and/or C preferably have a flexural modulus $E_B$ of more than 1300 MPa, more preferably of more than 1800 MPa, and are preferably each present at not less than 50% by weight, more preferably not less than 90% by weight, in layer A or C respectively.

Examples of preferred raw materials of layer B are thermoplastic elastomers based on: polyolefins (TPO), polyamides (TPA), polyurethanes (TPU), styrene block copolymers (TPS) and polyesters (TPC). Further-preferred raw materials are polyolefin copolymers such as ethylene-vinyl acetate (EVA), ethylene-acrylate (EA), soft polyethylene elastomers such as Affinity™, Engage™, Exact™, Tafmer™, soft polypropylene copolymers such as Vistamaxx™, Versify™, which have a low melting point as a result of random structure, and elastomeric heterophase polyolefins (with block structure, for example), such as Infuse™, Hifax™, Adflex™ or Softell™. Examples of styrene elastomers are Kraton™, Hybrar™, Septon™, Cariflex™, Vector™ and Styroflex™. The polymer of layer B preferably has a flexural modulus $E_B$ of below 1000 MPa, more preferably below 100 MPa, and is present in layer B preferably at not less than 50% by weight, more preferably at not less than 90% by weight.

More particularly the design of the film arrangement is such that at 10% extension it exhibits a force perpendicular to the cross section, in other words, where appropriate, in machine direction (MD) of the extrusion line, and transversely to the machine direction (CD—cross direction) of not more than 10 N/cm, preferably not more than 5 N/cm. The breaking extension in this case is preferably at least 400%. Furthermore, the film arrangement is preferably designed such that its total thickness is about 20 μm to about 150 μm, preferably about 40 μm to about 80 μm.

The film arrangement, more particularly the two layers A and B, can be produced by calendaring with subsequent lamination or, preferably, by coextrusion. The film arrangement is produced preferably in a flat film extrusion operation (T-die, cast, cast-film). The film arrangement is unstretched in order to allow it to have sufficient extensibility—that is, it has not been subjected to forced orientation in one or more directions in the partly crystalline state. Orientation in the melted state, of the kind occurring in the abovementioned production operations, is not (controlled) stretching (drawing).

In a further-preferred embodiment, the film arrangement may, in one or more layers, comprise typical additives such as fillers, pigments, impact modifiers, aging inhibitors, anti-blocking agents, foaming agents (blowing agents), light stabilizers, nucleating agents or lubricants. The film arrangement, moreover, may have been modified by embossing, corona treatment, or coating, such as priming or printing, for example.

The film arrangement may be used in particular as a carrier for labels or adhesive articles such as adhesive tapes or adhesive labels. For this purpose, in a further-preferred embodiment, the film arrangement features an adhesive layer, which is preferably disposed below layer C. The adhesive layer is preferably formed on the basis of a pressure-sensitive adhesive.

Test Methods

The measurements are made under test conditions of 23° C.±1° C. and 50±5% relative humidity.

The density of the polymers is determined in accordance with ISO 1183 and expressed in g/cm³. The melt index is tested in accordance with ISO 1133 at 190° C. and 2.16 kg and expressed in g/10 min. The crystallite melting point ($T_{cr}$) is determined using DSC (differential scanning calorimetry) with a heating rate of 10 K/min in accordance with ISO 3146. The flexural modulus is to be determined in accordance with ASTM D 790 (2% secant).

The tensile extension behaviour of the adhesive tape is determined on type 2 specimens (rectangular test strips with a length of 150 mm and a width, as far as possible, of 15 mm) in accordance with DIN EN ISO 527-3/2/300, with a test speed of 300 mm/min, a clamped-in length of 100 mm and a pre-tensioning force of 0.3 N/cm, the specimens having been cut to size with sharp blades for determining the data. The tensile extension behaviour is measured in machine direction (MD). The force is expressed in N/strip width and the breaking extension in percent. The test results, especially the breaking extension (elongation at break), must be statistically underpinned by a sufficient number of measurements.

The tension set (constant extension) is determined in a method based on DIN 7724, the test speed being 100 mm/min, the clamped-in length 50 mm, and the sample dimensions corresponding to those of a film strip in accordance with DIN EN ISO 527.

BRIEF DESCRIPTION OF THE DRAWINGS

Further details, features and objectives of the present invention will be illustrated in more detail below, with reference to exemplary embodiments. In the drawing

FIG. 1 shows in a diagrammatic representation a film arrangement 1 which can be employed, for example, as a carrier for adhesive articles such as adhesive tapes or labels. The film arrangement has a layer A and a layer B, the thickness of layer B being significantly greater than the thickness of layer A. In terms of their respective tension sets, the layers are harmonized in such a way that in the case of layer A the tension set is at least 60% while in the case of layer B it is not more than 50%. Furthermore there is also a layer C provided whose thickness is likewise smaller than the thickness of layer B. Furthermore, layer C also has a relatively high tension set. The resulting tension set of the film arrangement 1 as a whole is not critical.

The layers A, B and C are preferably each directly in contact with one another and so form the sequence A, B, C, meaning that layer B is enclosed by layers A and C. The precise design of the respective layers can be inferred, for example, from the examples which follow.

Figure 1:
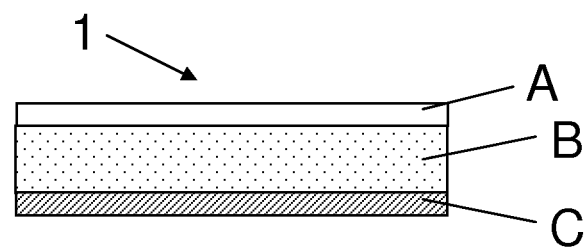
FIG. 1 shows, in diagrammatic representation, the construction of the film arrangement.
Figure 2:
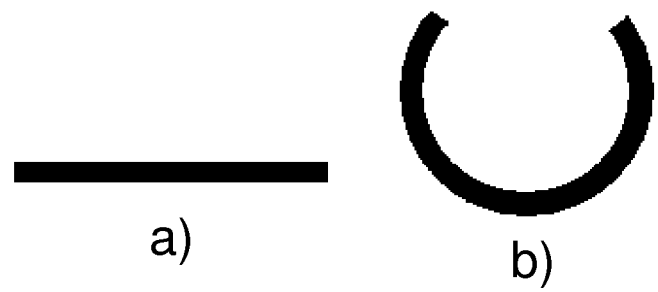
FIG. 2a-c shows different kinds of tubicity of the film arrangement after extension and relaxation.
Figure 2:
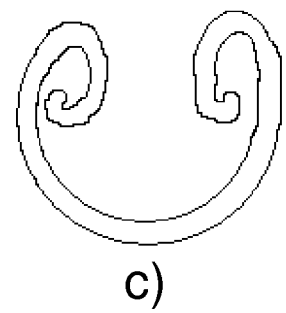

FIG. 2 shows types of deformation of the film arrangement 1 after extension and subsequent relaxation. Type 1-3 tubicity refers to the following behaviour of the film arrangement 1 after extension and relaxation under the abovementioned conditions for the determination of the tension set: type 1 is a specimen which has undergone substantially only two-dimensional deformation (FIG. 2a); type 2 is a sample which forms itself into a longitudinally slit hollow cylinder (FIG. 2b); and type 3 is a specimen which forms two hollow cylinders connected to one another at one side (FIG. 2c).

EXAMPLE 1

On a flat film extrusion line a film arrangement 1 is produced that has the following formula:

Layer 1 (A) 11 µm, Borealis HD 905 CF, $E_B$=2100 MPa, $E_S$=23.1 N/mm

Layer 2 (B) 45 µm Exxon VM 1100, $E_B$=13.6 MPa, $E_S$=0.612 N/mm

Layer 3 (C) 7 µm, Borealis HD 905 CF, $E_B$=2100 MPa, $E_S$=14.7 N/mm

| | |
|---|---|
| Tensile modulus in MD & CD: | 155 MPa |
| Breaking extension: | 675% |
| Tensile stress at 1% extension | 2.26 MPa |
| Tensile stress at 10% extension | 6.25 MPa |
| Tensile strength | 11.96 MPa |
| Tension set | 39% |
| Tubicity | type 3 |

EXAMPLE 2

Film arrangement 1, produced in the same way as in example 1:

Layer 1 (A) 9 µm, Borealis HD 905 CF, $E_B$=2100 MPa, $E_S$=18.9 N/mm

Layer 2 (B) 56 µm Exxon VM 1100, $E_B$=13.6 MPa, $E_S$=0.762 N/mm

Layer 3 (C) 4 µm, Borealis HD 905 CF, $E_B$=2100 MPa, $E_S$=8.4 N/mm

| | |
|---|---|
| Tensile modulus in MD & CD: | 181 MPa |
| Breaking extension: | 948% |
| Tensile stress at 1% extension | 1.94 MPa |
| Tensile stress at 10% extension | 5.54 MPa |
| Tensile strength | 16.42 MPa |
| Tension set | 43% |
| Tubicity | type 2 |

EXAMPLE 3

Film arrangement 1, produced in the same way as in example 1

Layer 1 (A) 9 µm, Dowlex 2032, $E_B$=1745 MPa, $E_S$=15.7 N/mm

Layer 2 (B) 32 µm Styroflex 2G366,=83 MPa, $E_S$=2.656 N/mm

Layer 3 (C), as layer 1

| | |
|---|---|
| Tensile modulus in MD & CD: | 164 MPa |
| Breaking extension: | 378% |
| Tensile stress at 1% extension | 1.55 MPa |
| Tensile stress at 10% extension | 6.3 MPa |
| Tensile strength | 19.3 MPa |
| Tubicity | type 1 |

EXAMPLE 4

Film arrangement 1, produced in the same way as in example 1

Layer 1 (A) 16 µm, Dow 7C06, $E_B$=1280 MPa, $E_S$=20.48 N/mm

Layer 2 (B) 35 µm Versify 2300, $E_B$=32 MPa, $E_S$=1.12 N/mm

Layer 3 (C) 2 µm, Dow 7C06, $E_B$=1280 MPa, $E_S$=2.56 N/mm

| | |
|---|---|
| Tubicity | type 2 |

EXAMPLE 5

Film arrangement 1, produced in the same way as in example 1

Layer 1 (A) 24 µm, Dow 7C06, $E_B$=1280 MPa, $E_S$=30.72 N/mm

Layer 2 (B) 60 µm Versify 2300 foamed with 1.5% Clariant Hydrocerol, $E_B$=28 MPa, $E_S$=1.68 N/mm

| | |
|---|---|
| Tubicity | type 2 |

COMPARATIVE EXAMPLE 1

Single-layer films 30 μm, Exxon VM 1100, $E_B$=13.6 MPa, $E_S$=0.408 N/mm

| | |
|---|---|
| Tensile modulus in MD & CD: | 13.5 MPa |
| Breaking extension: | 830% |
| Tensile stress at 1% extension | 0.94 MPa |
| Tensile stress at 10% extension | 3.42 MPa |
| Tensile strength | 14 MPa |
| Tension set | 43% |
| Tubicity | type 1 |

COMPARATIVE EXAMPLE 2

Single-layer films 30 μm, Basell HP 501 D, $E_B$=1400 MPa, $E_S$=42 N/mm

| | |
|---|---|
| Tensile modulus in MD & CD: | 1364 MPa |
| Breaking extension: | 413% |
| Tensile stress at 1% extension | 11 MPa |
| Tensile stress at 10% extension | 32 MPa |
| Tensile strength | 186 MPa |
| Tension set | 8% |
| Tubicity | type 1 |

The invention claimed is:

1. A planar film arrangement, having horizontal and longitudinal dimensions, comprising polyolefin layers A, B and C and further comprising at least one pressure-sensitive adhesive layer,
   layer A having a specific flexural modulus $E_s$ which is at least 20 times that of layer B,
   Layer B being in direct contact with layer A and layer C being in direct contact with layer B,
   Layer A having a thickness that is at least 1.5 times the thickness of layer C,
   layer A and layer B being initially unstretched, wherein said layers A and B have different tension sets from one another,
   said layer A has a tension set of at least 60% and
   said layer B has a tension set of not more than 50%
   said layer C having a tension set of at least 60%
   wherein said arrangement, upon a longitudinal extension of at least 100% and subsequent relaxation, forms a structured surface and undergoes three-dimensional deformation to
   form one or two hollow cylinders slit in the longitudinal direction.

2. The film arrangement according to claim 1 wherein layer A has a tension set of at least 70%, and/or layer B has a tension set of not more than 40%.

3. The film arrangement according to claim 1, wherein the thickness of layer B is at least three times the thickness of layer A.

4. The film arrangement according to claim 1, wherein the force at 10% extension is not more than 10 N/cm.

5. The film arrangement according to claim 1, wherein the thickness of the film arrangement is 20 μm to 150 μm.

6. The film arrangement according to claim 1, wherein layer A comprises a raw material having a flexural modulus of at least 1300 MPa, and contains said raw material at not less than 50% by weight.

7. The film arrangement according to claim 1, wherein layer B comprises a raw material having a flexural modulus of not more than 1000 MPa , and contains said raw material at not less than 50% by weight.

8. The film arrangement according to claim 1, wherein said arrangement is produced by coextrusion.

9. The film arrangement according to claim 1, wherein at least one of the layers is foamed.

10. The film arrangement according to claim 1, wherein at least one of the layers comprises a filler or a hydrocarbon resin.

* * * * *